United States Patent [19]

Beckman et al.

[11] 4,146,376
[45] Mar. 27, 1979

[54] MICROCOMPUTER CONTROLLED WINDER

[75] Inventors: John T. Beckman; John W. Lonberger, both of Newark, Ohio

[73] Assignee: Owens-Corning Fiberglas Corporation, Toledo, Ohio

[21] Appl. No.: 866,104

[22] Filed: Dec. 30, 1977

[51] Int. Cl.² .............................................. C03B 37/02
[52] U.S. Cl. ....................................... 65/2; 65/11 W; 65/29; 65/158; 242/18 G
[58] Field of Search ..................... 65/2, 11 W, 29, 158; 242/18 G

[56] References Cited

U.S. PATENT DOCUMENTS

| | | | |
|---|---|---|---|
| 3,471,278 | 10/1969 | Greim | 65/2 |
| 3,582,298 | 6/1971 | Trethewey | 65/2 X |
| 3,652,243 | 3/1972 | Jensen et al. | 65/2 |
| 4,046,536 | 9/1977 | Smithgall | 65/2 |

Primary Examiner—Robert L. Lindsay, Jr.
Attorney, Agent, or Firm—Ronald C. Hudgens; Charles F. Schroeder; Oliver E. Todd, Jr.

[57] ABSTRACT

An improved microcomputer controlled winder for attenuating a plurality of streams of molten glass issuing from a bushing into fibers and for collecting a strand of such attenuated fibers into a package. The microcomputer controls the winder speed in accordance with error between programmed data and a winder collet speed signal from a tachometer. The tachometer signal is modified to compensate for temperature variations in the bushing when a package is started after the bushing has been shut down for a period of time.

6 Claims, 2 Drawing Figures

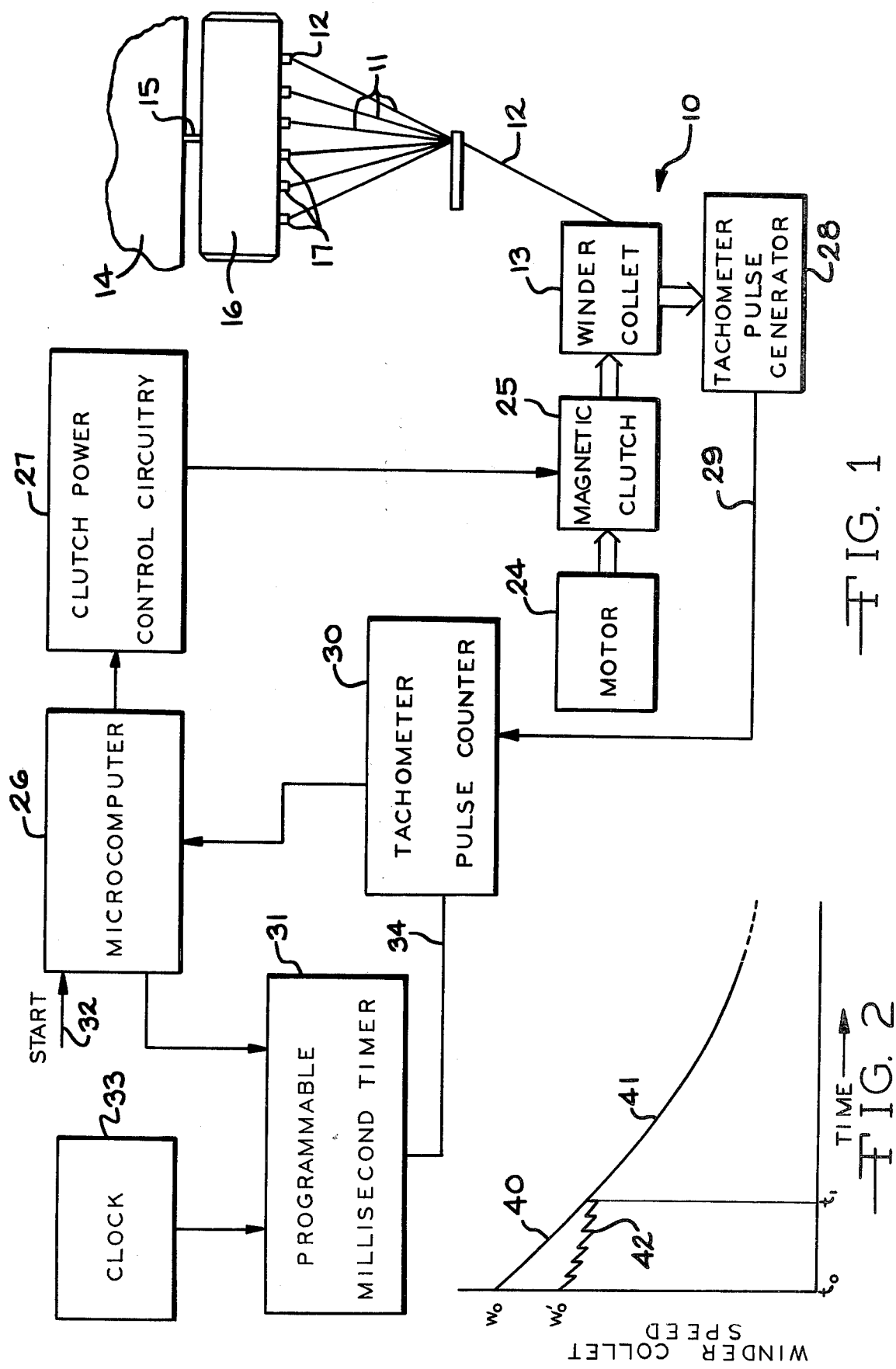

MICROCOMPUTER CONTROLLED WINDER

BACKGROUND OF THE INVENTION

This invention relates to glass fiber production and, more particularly, to an improved microcomputer controlled winder for attenuating a plurality of streams of molten glass into fibers and for collecting the fibers as a strand on a wound package.

One method for manufacturing textiles from glass involves attenuating a plurality of streams of molten glass into fibers, collecting the fibers into a strand and winding the strand into a package for subsequent use in manufacturing various products. The molten glass initially flows at a controlled rate from a furnace forehearth into a feeder or bushing which has a plurality of orifices formed in its bottom. As the molten glass flows from the orifices, it is pulled downwardly at a high rate of speed for attenuation into fibers. A plurality of the attenuated fibers are then gathered together into a strand, coated with a sizing, and the strand is wound onto a package on a winder collet. The speed of the winder collet is controlled in an attempt to maintain a uniform attenuation speed, which in turn produces a uniform diameter in the attenuated fibers if other conditions such as the temperature of the molten glass remain constant. Since the strand is wound onto a core to form a package, the diameter of the package will gradually increase. As the diameter increases, the rotational speed of the collet must be simultaneously decreased to maintain a constant attenuation rate.

Various controls have been known in the prior art for controlling a winder collet speed for maintaining a substantially uniform attenuation rate as the size of a package on which glass fibers are wound changes. In a typical prior art system, a digital computer or other process controller stores data corresponding to a desired winder collet speed at different predetermined points of time after the start of winding a package. At each of these points of time, the winder collet speed is sampled and compared with the desired speed for generating an error signal. The error signal is used to modify the winder collet speed in order to reduce the deviation between the desired speed and the actual speed. In one prior art system, as illustrated in U.S. Pat. No. 3,471,278 which issued Oct. 7, 1969, the winder speed is controlled by means of a magnetic clutch connecting a constant speed motor to a generator. The output from the generator in turn drives the winder motor. A digital computer generates an output signal which is converted to an analog signal for driving a ramp function generator. The ramp function generator in turn drives the magnetic clutch to warp or ramp down the speed of the winder collet as the diameter of the package increases to maintain a constant fiber attenuation and strand collection speed. In order to change the product collected on the winder, a different analog winder speed ramp curve must be stored in the digital computer.

In addition to a constant attenuation speed, other conditions must be uniform to achieve a uniform fiber diameter throughout a package. For example, the molten glass head within the bushing must remain constant to achieve a constant flow rate through the bushing orifices. Also, the temperature of the molten glass must remain constant to provide a constant viscosity of the molten glass and, therefore, a constant flow rate through the orifices. Ideally, a bushing is continuously operated under steady state conditions. Several winder collets are mounted on a turret. When a package on one winder collet is near completion, the next winder collet is brought up to speed. At the end of the package, the next winder collet is indexed to the winding position and the attenuated fiber strand is picked up and wound onto the second package. By continuous operation of this type, both production is increased and variations in the fiber diameter throughout the package are minimized. The winder collet speed controller automatically ramps down or warps the speed of each successive winder collet as the packages are formed. During this operation, the bushing is maintained at steady state conditions. The glass throughput which enters the bushing from the furnace forehearth and leaves the bushing from the plurality of orifices in the bushing bottom has a predetermined high temperature. In order to compensate for heat losses radiating from the bushing, an electric current is passed through the bushing for maintaining a desired temperature of the bushing and molten glass therein. Through this arrangement, the temperature of the molten glass issuing from the bushing orifices is carefully controlled to provide a uniform fiber diameter. However, for various reasons it is sometimes necessary to shut the bushing down for a short period of time. This may be caused by a break in the fibers forming the strand, for example. The downtime for the bushing may vary from a few minutes up to eight minutes or more, depending the availability of an operator to restart the bushing. During the first few minutes that a bushing is shut down, there is some decrease in temperature of the bushing due to the cessation of glass throughput. When the bushing is restarted, the slightly lower temperature causes an increase in the viscosity of the glass and, therefore, a decrease in the flow rate of the molten glass through the bushing orifices. If the normal attenuation speed is used at this time, it will be apparent that the diameter of the attenuated fibers will decrease. One prior art solution to this problem has been to discard the fibers initially made after a bushing has been shut down.

SUMMARY OF THE INVENTION

According to the present invention, the speed of a winder collet is controlled to maintain a predetermined attenuation rate for a plurality of glass fibers and for collecting a strand of the fibers into a package. A digital computer, such as an integrated circuit microcomputer, compares a feedback signal on the winder collet speed with a desired winder collet speed curve and generates an output which controls the winder collet speed. The feedback signal is generated by a tachometer pulse generator coupled to the winder collet. This pulse output is accumulated in a counter over a predetermined period of time, such as 100 milliseconds, for generating a digital signal corresponding to the winder collet speed. This signal is applied to the microcomputer for generating the speed control signal. During cold start of a bushing, the window or polling period for the tachometer counter is modified. For example, if the window is increased by six percent, the tachometer counter will accumulate a number which is six percent higher than the actual winder collet speed. When this signal is fed to the microcomputer, the microcomputer generates a control signal which slows down the winder collet speed by approximately six percent so that the apparent speed equals the desired speed. This in turn slows down the rate of attenuation of the fibers to compensate for the increased viscosity caused by the lower glass temperature. As the temperature of the bushing gradually increases towards its normal steady state temperature, the deviation in the polling time for the tachometer pulses is gradually modified until it reaches its normal 100 milliseconds when the bushing is at a steady state condition. Through this control arrangement, the actual time required to wind a package on the winder collet is slightly increased. However, the fiber wound onto the package will have a uniform diameter throughout the package despite a slight change in the viscosity of the glass issuing from the bushing during the cold start.

Accordingly, it is an object of the invention to provide an improved winder speed control circuit for attenuating streams of molten glass into fibers and for collecting a strand of such fibers into a package.

Another object of the invention is to provide a speed controller for a winder collet which attenuates streams of molten glass issuing from a bushing into fibers and collects the fibers into a package and wherein such winder collet speed is modified when starting from a bushing which has been shut down for a period of time.

Other objects and advantages of the invention will become apparent from the following description, with reference being made to the accompanying drawing.

BRIEF DESCRIPTION OF THE DRAWINGS

FIG. 1 is a schematic block diagram of apparatus in accordance with the present invention in which the speed of a winder collet is modified from a normal speed curve during cold start of a package of glass fibers attenuated from streams of molten glass issuing from a bushing; and FIG. 2 is a graph illustrating the normal and the modified winder collet speed curve of the present invention.

DESCRIPTION OF THE PREFERRED EMBODIMENTS

Turning now to the drawings and particularly to FIG. 1, a schematic block diagram is shown of apparatus 10 for producing a plurality of fibers or filaments 11 from glass or other thermoplastic material and for gathering the filaments 11 into a strand 12 which is wound into a package on a winder collet 13. Initially, the molten homogeneous glass is prepared in a furnace (not shown). The molten glass flow into a furnace forehearth 14 and from there a controlled stream 15 of the molten glass flows into a bushing or feeder 16. From the bushing 16, the molten glass flows into a plurality of streams through a grid of orifices 17 formed in the bottom of the bushing 16. Normally, the bushing 16 is electrically heated to control the temperature and therefore the viscosity of the issuing streams of molten glass. The streams of molten glass issuing from the orifices 17 are pulled at a high rate of speed for attenuation into the individual fibers 11. The attenuated fibers 11 pass downwardly in a generally conical pattern to a gathering member 18 which forms the strand 12. The gathering member 18 also may apply a suitable sizing fluid to the strand, in a known manner. From the gathering member 18, the strand 12 moves to the winder collet 13 where it is wound on a core to form a package. The winder collet 13 is of conventional design and includes a level wind apparatus for distributing the strand 12 in layers on the rotating core.

On collection of the strand into a wound package, a gradual buildup of the package radius occurs in the packaging cycle. For a given speed of the collection tube or core, the linear speed of attenuation is in effect gradually increased to a maximum linear speed towards the end of the packaging cycle. In other words, at the start of the packaging cycle, the linear speed of attenuation of the fiber from the feeder is determined both by the rotational speed of the package and by the circumference of the package which is based upon a relatively small radius. As buildup of the package occurs, the speed of attenuation is dependent upon increasing circumference of the package. If the speed of attenuation is allowed to increase, the diameter of the attenuated fibers will decrease, provided the temperature of the molten glass and other factors remain constant. This is due to the fact that the flow rate of the molten glass through the orifices 17 is determined in part by the viscosity of the glass which, in turn, is temperature dependent. Therefore, it is desirable to decrease the speed of the winder collet 13 as the package builds up to maintain a constant linear speed for attenuating the fibers. A constant attenuation speed produces a uniform fiber diameter throughout the package, provided other factors such as glass temperature remain constant.

The apparatus 10 is designed to modify the speed of the winder collet 13 during package buildup to maintain a predetermined speed profile for the winder collet 13 for each successive package cycle. Normally, the winder collet speed will gradually decrease through the package cycle to maintain a constant attenuation rate. However, other variations may be provided in the winder collet speed.

In the apparatus 10 illustrated in FIG. 1, the winder collet 13 is driven from a constant speed motor 24. The constant speed motor 24 is coupled through a magnetic clutch 25 which is electrically actuated. By controlling power to the clutch 25, the speed of the winder collet 13 is in turn controlled. A digital computer, such as an integrated circuit microcomputer 26, supplies data to clutch power control circuitry 27 which varies power to the magnetic clutch 25 for regulating the speed of the winder collet 13. A tachometer pulse generator 28 provides a feedback signal to the microcomputer 26 on the current speed of the winder collet 13. The microcomputer 26 then computes an error signal between the actual winder collet speed and a desired winder collet speed and supplies this error signal to the clutch power control circuitry 27. The clutch power control circuitry 27 in turn increases the average power to the magnetic clutch 25 when the winder collet 13 is driven too slowly and decreases power to the magnetic clutch 25 when the winder collet 13 is driven too fast. The microcomputer 26 provides a digital output signal which causes the clutch power control circuitry 27 to provide a desired power signal to the magnetic clutch 25. The clutch power control circuitry 27 may be of any conventional design and may, for example, comprise a digital to analog converter and a ramp function generator. The output from the digital to analog converter drives the ramp function generator to apply power to the magnetic clutch 25. Normally, the ramp function generator would provide a decreasing power to the magnetic clutch 25 as the package on the winder collet 13 builds up in order to maintain a constant attenuation speed for the fibers 11. It should be appreciated that other types of circuitry may also be used for the clutch power control circuitry 27. For example, an AC power source may be connected to phase fired silicon controlled rectifiers for controlling power to the magnetic clutch 25. It should also be noted here that the magnetic clutch 25 may be eliminated and the speed of the motor 24 may be controlled directly for controlling the speed of the winder collet 13. Or, the magnetic clutch 25 may couple the motor 24 to an AC generator which in turn drives a motor in the winder collet 13 at a controlled speed. Such an arrangement is shown, for example, in the above-mentioned U.S. Pat. No. 3,471,278.

The tachometer pulse generator 28 provides a pulse output 29 having a frequency proportional to the speed of the winder collet 13. The pulses on the output 29 are accumulated in a tachometer pulse counter 30 for a predetermined polling time or window to store a signal in the tachometer pulse counter 30 corresponding to the winder collet speed. The polling time or window is controlled by a programmable millisecond timer 31. After tachometer pulses are accumulated in the tachometer pulse counter 30 for the predetermined time interval, the digital contents of the pulse counter 30 are shifted to the microcomputer 26 for comparing with a desired winder collet speed. The desired winder collet speed may be stored in a memory in the microcomputer 26 in the form of a digitized analog speed curve or it may be in the form of a polynomial formula which is solved for a time t from the beginning of a package on the winder collet 13. A start signal 32 is provided to the microcomputer 26 either directly from the winder collet 13 at the beginning of a package or manually when an operator of the apparatus 10 starts a package. The microcomputer 26 then continuously measures the time from the start of a package for use in determining a desired winder collet speed which is compared with the actual winder collet speed received from the tachometer pulse counter 30.

The programmable millisecond timer 31, for example, may be a commercially available unit, such as a Motorola type MC6840 programmable timer integrated circuit. The programmable millisecond timer 31 has an input from a reference clock pulse generator 33 and also has an input from the microcomputer 26 which programs the timer 31 for selecting the time interval of pulses on an output 34. The output 34 is applied to the tachometer pulse counter 30 for shifting the contents of the pulse counter 30 to the microcomputer 26. The microcomputer 26 may, for example, program the timer 31 to provide an output pulse 34 every 100 milliseconds. As a consequence, every 100 milliseconds the contents of the counter 30 which represents the speed of the winder collet 13 are shifted to the microcomputer 26. The speed signal shifted from the pulse counter 30 to the microcomputer 26 is used in computing an error signal for correcting the winder collet speed to a desired value for maintaining a predetermined attenuation rate for the fibers 11.

Normally, the microcomputer 26 supplies an output for controlling the winder collet speed to ramp down the winder collet speed uniformly in each successive package. Through the use of an automatic winder, when one package is filled, the winder collet 13 indexes a turret to start a new package so that the filaments 11 are continuously attenuated from package to package at a constant rate. By maintaining a constant glass throughput for the bushing 16, the temperature and therefore the viscosity of the glass forming the fibers 11 remains constant. However, at times the bushing 16 may be shut down. This may be caused, for example, by the breakage of one or more of the filaments or fibers 11. Once the bushing 16 is shut down, an operator must manually restart the bushing 16. The downtime will vary considerably with the availability of an operator for restarting the bushing 16. During the initial down period for the bushing 16, the temperature for the molten glass within the bushing 16 gradually decreases by a slight amount. For example, the temperature of the molten glass in the down bushing may decrease slightly for approximately the first eight minutes of which the bushing is down and then will maintain a new steady state condition determined by the rate at which the bushing 16 is electrically heated. When the bushing is restarted, the increased viscosity of the glass within the bushing decreases the glass throughput in the bushing and, therefore, decreases the size of the attenuated fibers 11 if attenuation is maintained at a normal rate. In accordance with the present invention, the winder collet speed is automatically decreased when a new package is started after the bushing 16 has been down. This winder collet speed decrease is accomplished by sending to the microcomputer 26 an erroneous feedback speed signal which indicates that the winder collet 13 is driven at a higher rate of speed. For example, if the winder collet speed signal is erroneously indicated as being ten percent high, the microcomputer 26 will decrease power to the magnetic clutch 25 to decrease the winder collet speed by ten percent or aparently back to its normal value. However, the winder collet speed will actually be ten percent below the speed which the microcomputer 26 computes as the winder collet speed.

After restarting the bushing 16, the temperature of the molten glass issuing from the orifices 17 will gradually increase over a period of time back to its normal steady state temperature. As the temperature gradually increases, the viscosity of the molten glass similarly decreases. Therefore, the percentage compensation of the winder collet speed should be gradually decreased from a predetermined initial percentage compensation down to zero percent compensation. For purposes of illustration, it will be assumed that the bushing 16 will return to its normal steady state operating condition approximately four minutes after a cold start. It will also be assumed that the speed of the winder collet 13 should be reduced initially by six percent to obtain fibers 11 having the same diameter which is achieved under normal operating conditions. As illustrated in the following table and in FIG. 2, the modification in the winder collet speed will decrease from an initial six percent to zero percent in one percent increments lasting approximately forty seconds each. Normally, the microcomputer 26 receives a winder collet speed signal from the tachometer pulse counter 30 every 100 milliseconds. The microcomputer 26 is programmed to assume that speed data received from the tachometer pulse counter 30 is received at 100 millisecond intervals and uses this time in computing or determining a desired speed for the winder collet 13 at each point in a package. However, the microcomputer 26 modifies programming data supplied to the programmable millisecond timer 31 to set the window or polling interval at 106 milliseconds at the beginning of a package. As a consequence, the tachometer pulse counter 30 will accumulate a count of pulses from the tachometer pulse generator 28 which is six percent higher than the actual speed of the winder collet 13. This erroneous data will then be shifted from the tachometer pulse counter 30 to the microcomputer 26 for computing an output which is applied to the clutch power control circuitry 27 for decreasing the winder collet speed by six percent. Under normal conditions, 400 polls or measurements by the tachometer pulse counter 30 will occur in forty second interval. However, the actual time required will be 42.4 seconds when the interval is changed to 106 milliseconds. It will be noted that by decreasing the speed of the winder collet 13 and similarly increasing the time for the 400 polls, the winder collet 13 will have collected the same amount of strand 12 over 42.4 seconds that it normally would have collected over forty seconds. Thus, the time of the package is slightly increased while the total contents of the package will remain the same. After the first 400 polls, the microcomputer 26 modifies data to the programmable millisecond timer 31 to decrease the modification of the winder collet speed to only five percent below normal. In other words, the polling time or output from the millisecond timer 31 now occurs at 105 millisecond intervals. This causes a step increase in the speed of the winder so that the speed of the winder is now five percent below its normal speed rather than six percent below the normal speed. Four hundred polls will be taken from the counter 30 at 105 milliseconds each for a total of 42.0 seconds in place of the normal 40 seconds required for 400 polls. The programmable millisecond timer 31 is then modified by the microcomputer 26 to measure timer intervals of 104 milliseconds for a four percent decrease in the speed from normal. This continues for 400 polls and then the speed is decreased from normal by three percent for 400 polls, by two percent for 400 polls, by one percent for 400 polls and then the speed returns to normal. During the six steps or increments in which the speed was decreased from normal, 248.4 seconds were required in place of the normal 240 seconds. Although this period has been stretched by 8.4 seconds, the same number of lineal feet of the strand 12 has been collected on the package since the speed of the winder collet 13 was decreased at the same time. This arrangement is illustrated in the curve of FIG. 2 where the curve segment 40 illustrates the normal winder collet speed from the time $t_0$ at the beginning of a package to the time $t_1$ and the curve segment 41 represents the speed of the winder collet from the time $t_1$ to the completion of a package. During cold start, the microcomputer 26 modifies the time interval measured by the programmable millisecond timer 31 in six steps from six percent back to normal to follow the stepped curve 42. However, the time $t_0$ to the time $t_1$ has been increased by 8.4 seconds, as discussed above. Instead of an initial starting speed of $W_0$ for the winder collet, the initial speed is decreased by six percent to $W_0'$ at the beginning of a package at time $t_0$.

Table

| Nominal Time for 400 Polls | % Increase | Polling Time | Actual Time for 400 Polls |
|---|---|---|---|
| 40 sec | 6% | 106 ms | 42.4 sec |
| 40 sec | 5% | 105 ms | 42.0 sec |
| 40 sec | 4% | 104 ms | 41.6 sec |
| 40 sec | 3% | 103 ms | 41.2 sec |
| 40 sec | 2% | 102 ms | 40.8 sec |
| 40 sec | 1% | 101 ms | 40.4 sec |
| 40 sec | 0% | 100 ms | 40.0 sec |
| 40 sec | 0% | 100 ms | 40.0 sec |

Although the speed of the winder collet 13 is illustrated as being decreased during cold start, it should be noted that the present invention may also be used for increasing the winder collet speed in the event that the temperature of the molten glass issuing from the orifices 17 is above normal. When the temperature is above normal, the viscosity of the molten glass decreases to increase the flow rate through the orifices 17. This in turn requires a higher attenuation speed. The attenuation speed may be increased by programming the programmable millisecond timer 31 to measure time intervals less than the assumed normal 100 milliseconds, such as 95 milliseconds for approximately a five percent increase in speed.

It will also be noted that the temperature of the bushing 16 gradually drops after a shutdown and may, for example, reach a new steady state condition after a predetermined period of time such as eight minutes after a shutdown. If the bushing 16 is shut down for only four minutes, it may be necessary to modify the speed of the winder collet by only two percent instead of six percent when the winder collet is shut down for the full eight minutes or more. The microcomputer 26 may be programmed to monitor the shutdown time for the bushing 16 and to select the percentage speed variation in accordance with the actual shutdown time.

Various other changes and modifications may be made in the apparatus 10 without departing from the spirit and the scope of the following claims. It should be appreciated that the actual manner in which the clutch power control circuitry 27 controls the speed of the winder collet 13 may be varied in any of several known manners without departing from the present invention.

What we claim is:

1. A method for producing fibers from a thermoplastic material comprising the steps of flowing a stream of the molten material at a predetermined temperature through an orifice, attenuating said stream into a fiber by pulling, collecting the attenuated fiber on a wound package, regulating the rotational speed of said wound package in response to a desired rotational speed and a measured rotational speed of said wound package to maintain a predetermined speed curve, and modifying said regulated speed of said wound package of said predetermined speed curve in response to stopping and restarting of attenuation to compensate for temperature changes in the molten material flowing through the orifice at the beginning of a wound package, said regulated speed being modified by changing the measured package speed by a preselected factor and regulating the rotational speed in response to said desired rotational speed and the modified measured speed.

2. A method for producing fibers from a thermoplastic material, as set forth in claim 1, wherein said regulated speed is modified by modifying said measured speed by a preselected factor which is decreased in steps over a predetermined period of time after a restarting of attenuation.

3. Apparatus for producing continuous fibers from a thermoplastic material comprsing a feeder adapted to contain a molten supply of the material and having a plurality of orifices formed therein, said orifices issuing a like plurality of streams of the molten material, and means for attenuating the streams into fibers and for collecting said fibers into a wound package including collet means for supporting the package, means for rotating said collet means, tachometer means for generating a pulse signal having a frequency proportional to the rotational speed of said collet means, means for counting pulses in said signal for a predetermined time interval, means responsive to the count in said counting means after said predetermined time interval for controlling the speed which said rotating means rotates said collet means, and means responsive to a stopping and restart of said feeder for modifying said predetermined time interval to compensate the speed of said collet means for changes in the material flow rate through said feeder orifices.

4. Apparatus for producing continuous fibers from a thermoplastic material, as set forth in claim 3, wherein said modifying means includes programmable timer means for measuring the predetermined time interval for controlling said counting means.

5. Apparatus for producing continuous fibers from a thermoplastic material, as set forth in claim 4, wherein said speed controlling means includes digital computer means for generating an output in response to stored data on a desired speed for said collet means and to the count in said counting means after said predetermined time interval, and means responsive to such output for controlling the speed which said rotating means rotates said collet means, said digital computer means including means for programming the predetermined time interval measured by said programmable timer means.

6. Apparatus for producing continuous fibers from a thermoplastic material comprising a feeder adapted to contain a molten supply of the material and having a plurality of orifices formed therein, said orifices issuing a like plurality of streams of the molten material, and means for attenuating the streams into fibers and for collecting said fibers into a wound package including collet means for supporting the package, means for measuring the rotational speed of the package, means responsive to the measured package speed for rotating said collet means at a predetermined varying speed for each package, and means responsive to a stopping and restart of said feeder for modifying said predetermined varying speed to compensate the speed of said collet means for changes in the material flow rate through said feeder orifices, said modifying means including means for modifying the measured package speed by a predetermined factor, and wherein said rotating means is responsive to the modified measured package speed.

* * * * *